United States Patent
Bark

(10) Patent No.: US 8,282,335 B2
(45) Date of Patent: Oct. 9, 2012

(54) LIFTGATE AND MOUNTING BRACKET SYSTEM

(75) Inventor: Paul Bark, Canyon Lake, CA (US)

(73) Assignee: RS Drawings, LLC, Santa Fe Springs, CA (US)

( * ) Notice: Subject to any disclaimer, the term of this patent is extended or adjusted under 35 U.S.C. 154(b) by 568 days.

(21) Appl. No.: 12/483,883

(22) Filed: Jun. 12, 2009

(65) Prior Publication Data

US 2010/0313479 A1 Dec. 16, 2010

(51) Int. Cl.
*B60P 1/00* (2006.01)
(52) U.S. Cl. ........ 414/812; 414/545; 414/546; 414/558; 414/921; 403/3; 403/24; 296/56
(58) Field of Classification Search .................. 414/558, 414/545, 546, 812, 921; 403/3, 24; 296/56
See application file for complete search history.

(56) References Cited

U.S. PATENT DOCUMENTS

| | | | |
|---|---|---|---|
| 2,733,786 A * | 2/1956 | Drake | 52/633 |
| 3,028,937 A * | 4/1962 | Grabowski et al. | 403/3 |
| 3,250,051 A * | 5/1966 | Cheris | 52/634 |
| 3,666,121 A | 5/1972 | Denner et al. | |
| 5,234,311 A | 8/1993 | Loduha et al. | |
| 6,089,817 A | 7/2000 | Tauer | |
| 6,179,546 B1 | 1/2001 | Citrowske | |
| 6,183,187 B1 | 2/2001 | Ablabutyan | |
| 6,572,303 B2 * | 6/2003 | Jensen | 403/24 |
| 7,384,232 B2 | 6/2008 | Morris | |
| 2004/0009056 A1 * | 1/2004 | Kreutinger | 414/557 |
| 2004/0156705 A1 * | 8/2004 | Ablabutyan et al. | 414/557 |

OTHER PUBLICATIONS

Notification of Transmittal of the International Search Authority, International Search Report and Written Opinion dated Sep. 2, 2010 for International Application No. PCT/US2010/038194 from ISA/US Commissioner for Patents, pp. 1-14, Alexandria, Virginia, United States.
International Preliminary Report on Patentability and Written Opinion dated Dec. 22, 2011 for International Application No. PCT/US2010/038194 from International Bureau, filed Jun. 10, 2010, pp. 1-9, Geneva, Switzerland.

* cited by examiner

*Primary Examiner* — Scott Lowe
(74) *Attorney, Agent, or Firm* — Michael Zarrabian, Esq.; Sherman & Zarrabian LLP

(57) ABSTRACT

The present invention provides a method and system of installing a liftgate under a vehicle bed. In one implementation, the system includes a liftgate and a mounting device. The mounting device comprises at least one mounting bracket having a group of multiple substantially horizontal slots vertically stacked relative to one another so as to be at different heights relative to ground when the bracket is installed under a vehicle bed essentially parallel to ground. The slots are vertically spaced on the bracket relative to one another to accommodate different vehicle bed heights so as to maintain the liftgate within a desired vertical ground clearance when mounted in a slot on said bracket under a vehicle bed.

28 Claims, 19 Drawing Sheets

| BED HEIGHT | SLOT |
|---|---|
| 46" | MIDDLE |
| 47" | MIDDLE |
| 48" | MIDDLE |
| 49" | MIDDLE |
| 50" | MIDDLE |
| 51" | MIDDLE |
| 52" | BOTTOM |
| 53" | BOTTOM |

3" CROSSMEMBERS

FIG. 5A

| BED HEIGHT | SLOT |
|---|---|
| 46" | TOP |
| 47" | TOP |
| 48" | TOP |
| 49" | MIDDLE |
| 50" | MIDDLE |
| 51" | MIDDLE |
| 52" | BOTTOM |
| 53" | BOTTOM |

4" CROSSMEMBERS

FIG. 5B under a vehicle bed essentially parallel to ground. The slots are vertically spaced on the bracket relative to one another to accommodate different vehicle bed heights so as to maintain the liftgate within a desired vertical ground clearance, when mounted in a slot on said bracket under a vehicle bed. This provides ease of installation and reduction in time of installation.

LIFTGATE AND MOUNTING BRACKET SYSTEM

BACKGROUND OF THE INVENTION

1. Field of the Invention

The present invention relates generally to liftgates, and in particular, to mechanisms for mounting liftgates on vehicles.

2. Description of Related Art

Lifts such as liftgates are typically mounted at a structure such as the rear of a vehicle to lift payloads on a platform from one level (e.g., ground level) up to another level (e.g., the bed of the vehicle), or vice versa.

One type of liftgate employs linkages to maintain the lift platform in a horizontal plane through the lifting range. The lift platform is attached to linkages by pivot members, which allow the lift platform to be pivoted. Operation of the lifting mechanism may also rotate the lift platform into an inverted, stowed position beneath the vehicle body. Hydraulic actuators and electric actuators are used to provide lifting force for moving the lift.

BRIEF SUMMARY OF THE INVENTION

The present invention provides a method and system of installing a liftgate under a vehicle bed. In one embodiment, the system includes a liftgate and a mounting device. The liftgate comprises a platform coupled to a support frame via a lift linkage, the platform capable of being moved by an actuator via the lift linkage between a raised position and a lowered position.

The mounting device comprises at least one mounting bracket having a group of multiple substantially horizontal slots substantially vertically stacked relative to one another so as to be at different heights relative to ground when the bracket is installed under a vehicle bed essentially parallel to ground. The slots are vertically spaced on the bracket relative to one another to accommodate different vehicle bed heights so as to maintain the liftgate within a desired vertical ground clearance, when mounted in a slot on said bracket under a vehicle bed. This provides ease of installation and reduction in time of installation.

Installation involves attaching the bracket under the vehicle bed and selecting a slot based on the vehicle bed height and desired liftgate ground clearance range. Then, the liftgate is slidably mounted on the selected slot under the vehicle bed and slid in the slot towards the rear of the vehicle bed. Next, said platform is fully raised until it abuts against the vehicle body. If the fully raised platform is vertically at a level above the vehicle bed, then it is necessary to lower the platform to be level with the vehicle bed. If there is a horizontal gap between the leveled platform and the vehicle bed, then it is necessary to slide the liftgate in the slot towards the vehicle bed to close the gap. The final step is fixing the liftgate in relation to the slot to prevent further slidable movement of the liftgate in the slot.

The bracket allows the liftgate to be slidably mounted on a selected slot of the mounting bracket under a vehicle bed, and to maintain the liftgate within a desired vertical ground clearance range.

A slot is selected from among the multiple slots based on vehicle bed height to ground to maintain the liftgate within a desired vertical ground clearance when mounted on the bracket, and the liftgate is horizontally slid in the slot for position adjustment relative to the vehicle bed.

These and other features, aspects and advantages of the present invention will become understood with reference to the following description, appended claims and accompanying figures.

BRIEF DESCRIPTION OF THE DRAWINGS

FIGS. 5A-B show example recommendations for selecting slots in mounting the liftgate depending on vehicle bed height relative to ground, for vehicles with 3" and 4" crossmembers, respectively, according to an embodiment of the invention.

DETAILED DESCRIPTION OF THE INVENTION

Figure 1:
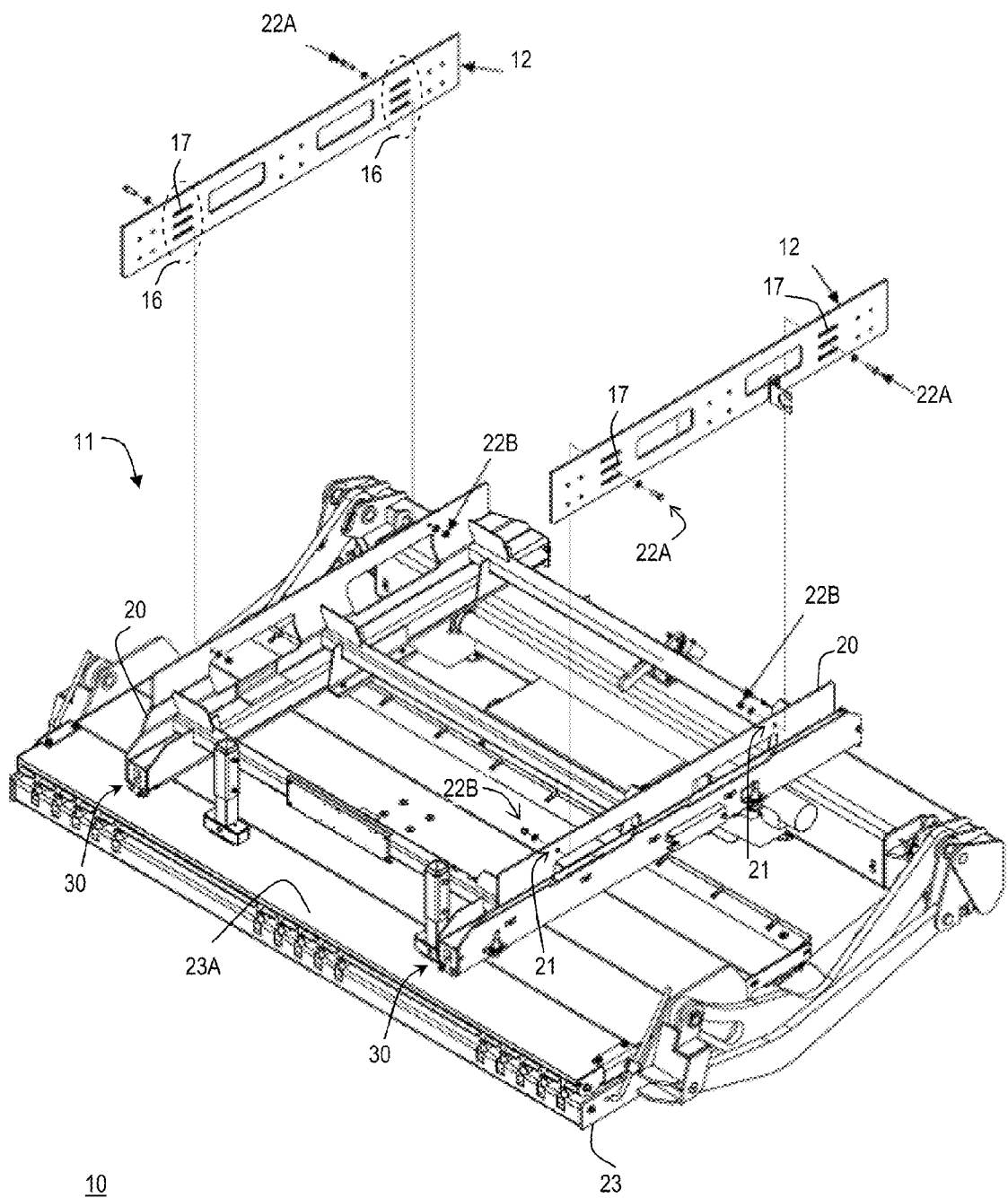
FIG. 1 illustrates a perspective view of a liftgate system comprising a liftgate assembly (liftgate) and mounting brackets, wherein the liftgate is a stow away liftgate, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The present invention provides a liftgate system and method of mounting the liftgate system on a vehicle, such as a truck. In one embodiment, the liftgate system comprises a liftgate assembly ("liftgate") and a pair of mounting brackets for mounting the liftgate under the bed of a vehicle. Each mounting bracket is substantially rectangular in shape, at least a set (group) of multiple substantially horizontal slots which are vertically stacked relative to one another, so as to be at different heights relative to ground when the bracket is installed under the vehicle bed essentially parallel to ground. In another embodiment, a single mounting bracket may be used which has said slots.

The slots are at various heights, allowing mounting of the liftgate at different vehicle bed height ranges and providing maximum ground clearance from the bottom of the liftgate. Depending on the vehicle bed height to the ground, one of the multiple slots allows mounting the liftgate on brackets under the vehicle bed for desired (e.g., preferably maximum) ground clearance from the bottom of the liftgate to the ground.

After initially mounting the liftgate in selected mounting bracket slots via bolts, the liftgate is slid fully backward to the vehicle rear while horizontally sliding in the bracket slots. Upon fully raising the liftgate platform, if the platform level is higher than the bed, then the platform is lowered somewhat to vertically level it with the vehicle bed. Then, the liftgate is slid forward towards the front of the vehicle. Then the liftgate slides forward in the mounting bracket slots, until the platform meets the vehicle bed. Then the bolts are tightened. This allows maintaining maximum ground clearance between the liftgate mounted under the vehicle bed in the mounting bracket slots, while enabling substantially horizontal sliding of the liftgate in the slots, and lining up the lift platform and the vehicle bed in substantially horizontal and vertical directions.

Specifically, in mounting the liftgate on the brackets, the slots for mounting the liftgate are selected based on the unloaded vehicle bed height to provide a desired ground clearance range for the mounted liftgate as the vehicle is fully loaded and fully unloaded. For lowest vehicle bed height, the higher most slots are selected for mounting the liftgate to provide most ground clearance. Bed height is measured from ground to the floor of the vehicle where objects are to be loaded/unloaded to/from. The liftgate is then slidably mounted via bolts in selected mounting bracket slots.

Then, in an adjustment sequence, the liftgate is horizontally moved as far back as possible towards the rear of the vehicle while sliding in the slots. Next the liftgate is operated as routine to raise its platform until the platform meets the vehicle. If at this point the platform is at a vertically higher level than the vehicle bed, then the platform is lowered to be level with the vehicle bed. If lowering the platform causes a horizontal gap between the platform and the vehicle bed, then the liftgate is moved horizontally in the opposite direction (towards the front of the vehicle) while sliding in the mounting bracket slots, until the platform meets the edge of the vehicle bed (i.e., the horizontal gap is eliminated). At this point, the bolts can be tightened to maintain the liftgate in place. As such, the substantially horizontal slots allow lining up the platform with the vehicle bed. During the above adjustment operations, the liftgate ground clearance remains unchanged. This provides ease of installation of the lift gate on the vehicle, and reduction in time of such installation.

Figure 14A:
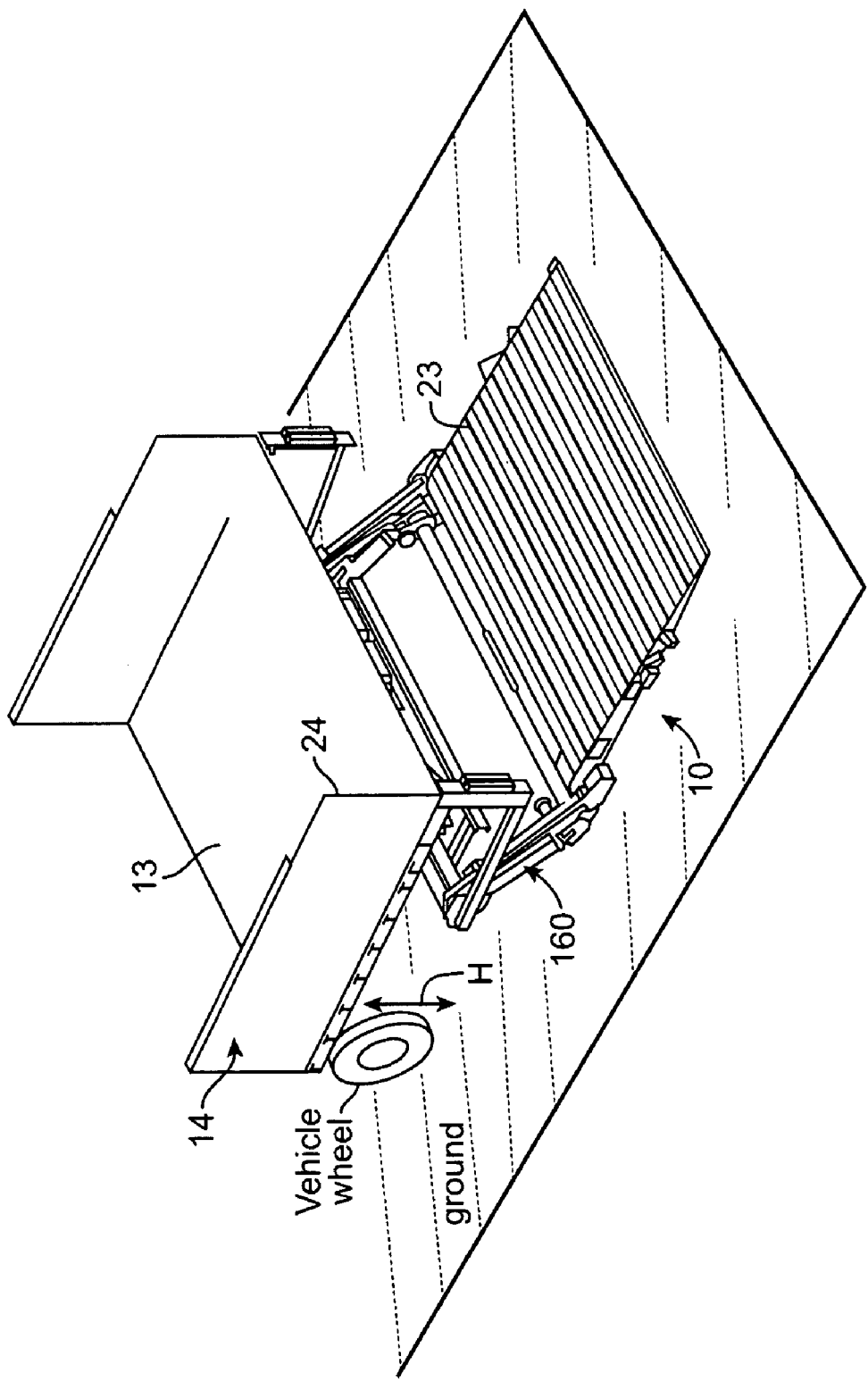
FIG. 14A shows a rear left perspective view of a liftgate system comprising a liftgate mounted on mounting brackets under a vehicle bed, with the lift platform unfolded and lowered to the ground, according to an embodiment of the invention.

Referring to FIG. 1, in one embodiment of the invention, a liftgate system 10 comprises a liftgate assembly ("liftgate") 11 and a pair of mounting brackets 12 for mounting the liftgate 11 under vehicle bed 13 of a vehicle 14 (FIG. 14A). The liftgate 11 in this example is a stow away type but the invention is useful with other types of liftgates as well.

In this example, each mounting bracket 12 is substantially rectangular in shape, having plural sets 16 of multiple substantially horizontal slots 17. In one example, substantially horizontal slots comprise slots within about ±5° of orientation in relation to one another. Further, each substantially horizontal slot is within about ±5° of horizontal relative to ground once the bracket 12 is installed on a vehicle essentially horizontal (parallel) to ground. In one implementation, each mounting bracket 12 includes two sets 16 of substantially horizontal triple slots 17. The slots 17 in each set 16 are vertically stacked relative to one another at different heights relative to ground when attached under the vehicle bed. Further, the slots can be of same or different widths and may be stacked in a staggered pattern. In one example, each mounting bracket 12 may be made of resilient material such as steel, and be about 6 inches wide and as long as needed. Further, in one example, each slot 17 can be about 0.25 to 1 inches wide and preferably about 0.5 inch wide; about 1 to 3 inches long and preferably about 2.5 inches long. In one example, each slot 17 may be vertically spaced about 1 to 2 inches and preferably 1.5 inches, from another slot 17.

Figure 2:
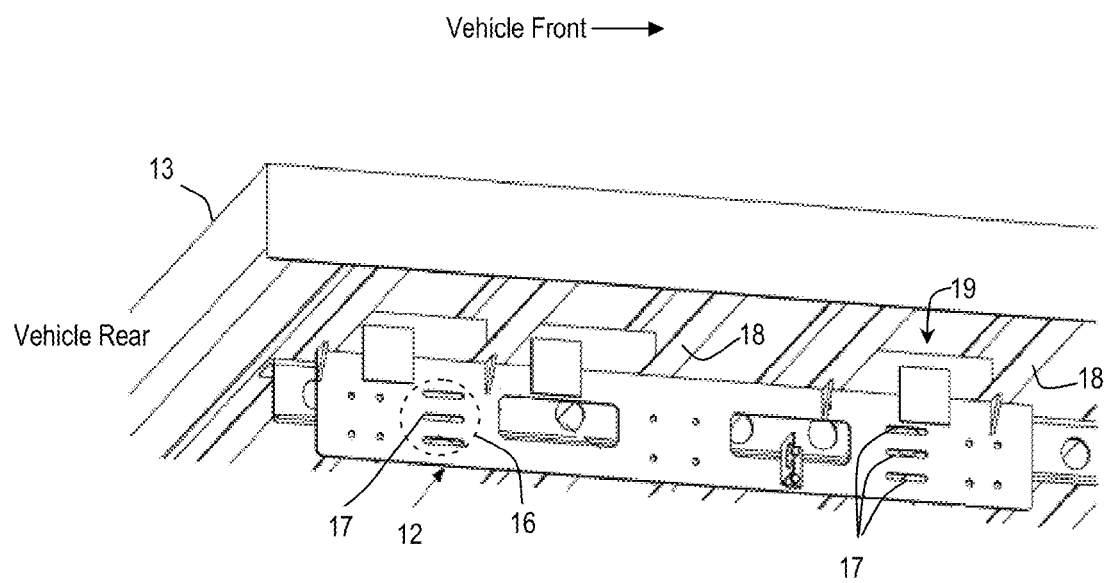
FIG. 2 shows a right side rear perspective view of a mounting bracket with mounting slots, attached under a vehicle bed, according to an embodiment of the invention.

FIG. 2 shows a right side perspective view wherein a mounting bracket 12 is fixedly attached (e.g., welded) to crossmembers 18 under a vehicle bed 13 via supports 19, according to an embodiment of the invention.

Figure 3A:
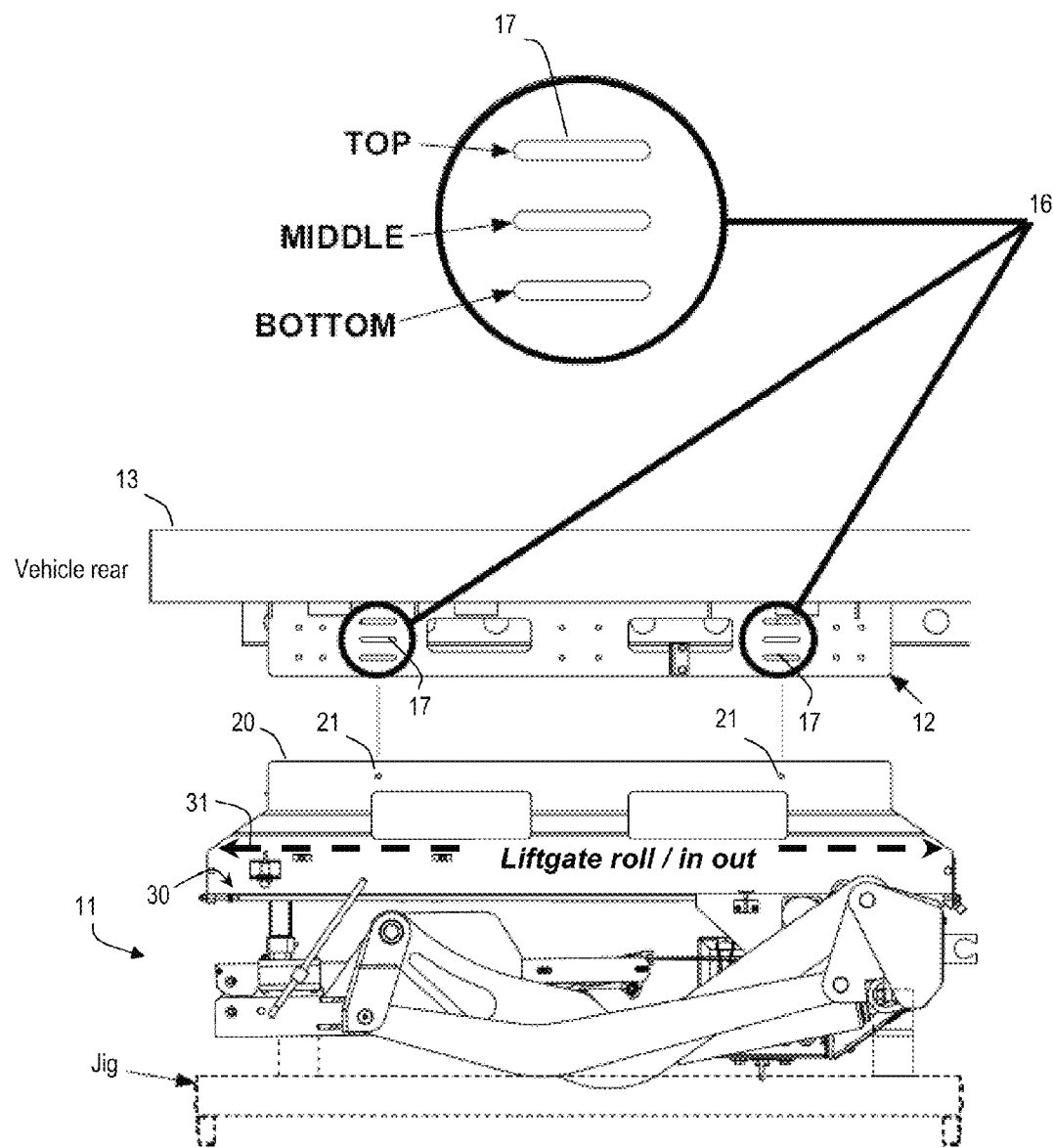
FIG. 3A shows a right side view of the liftgate being lined up for mounting on the mounting bracket slots under the vehicle bed, according to an embodiment of the invention.
Figure 3B:
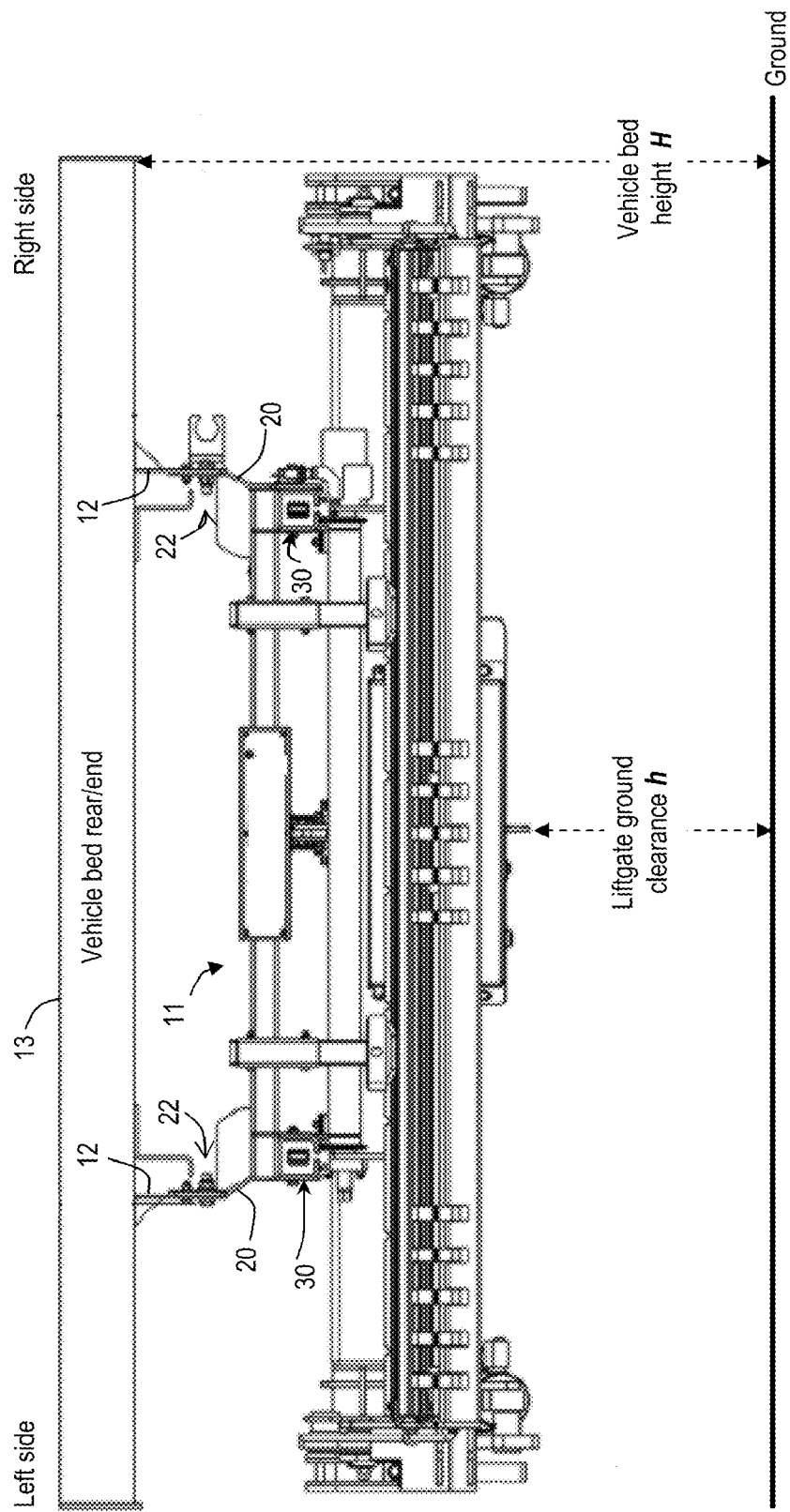
FIG. 3B shows an end view of a liftgate system mounted under the vehicle bed, according to an embodiment of the invention.

FIG. 3A shows a right side view of the liftgate 11 being raised by a jig for mounting in one the mounting slots 17 on a mounting bracket 12 under the vehicle bed 13. FIG. 3B shows an end view of liftgate system under the vehicle bed 13. The liftgate 11 includes two spaced parallel sliders 20 (FIGS. 1, 3B), one on each side, corresponding to the brackets 12 for suspending the liftgate 11 from the brackets 12. The mounting brackets 12 are attached under the bed 13 with essentially the same spacing as that between the sliders 20.

The sliders 20 are shaped to engage the brackets 12 using attachment mechanisms. For example, each slider 20 includes two openings 21 having similar spacing therebetween as there is between sets 16 of slots 17 on a corresponding bracket 12. For liftgate mounting (installation), each opening 21 is generally lined up with a selected slot 17, and slidably engaged therewith via an attachment mechanism such as a bolt 22 comprising a screw 22A and nut 22B.

Figure 4A:
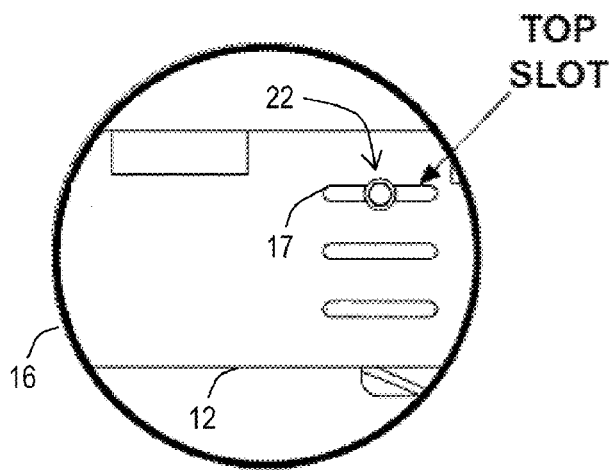
FIGS. 4A-C show alternate views of a liftgate mounted in top, middle and bottom slots, respectively, of a mounting bracket, according to embodiments of the invention.
Figure 4B:
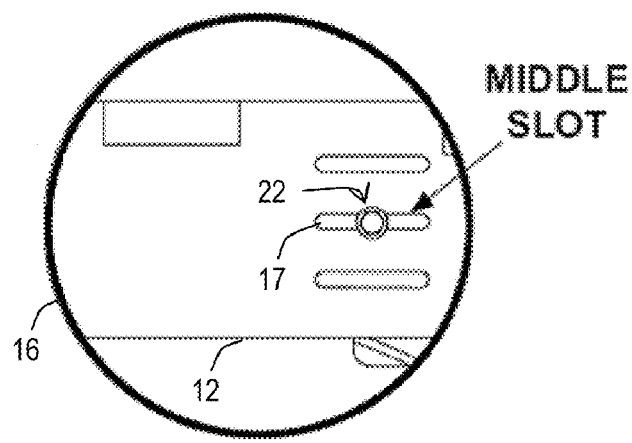
Figure 4C:
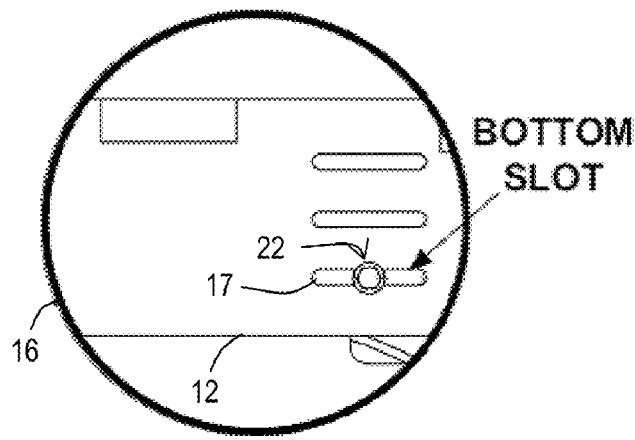

FIGS. 4A-C show alternate views of the liftgate 11 slidably mounted in top, middle and bottom mounting slots 17, respectively, of a mounting bracket 12 via a bolt 22, according to embodiments of the invention. As noted, selection of a slot 17 (e.g., top, middle or bottom) depends on the vehicle bed height which is vertical distance H between the vehicle bed 13 to the ground (FIG. 14A). FIGS. 5A-B show example recommendations (suggestions) for selecting mounting slots 17 depending on vehicle bed height for vehicles with 3" and 4" crossmembers, respectively, according to an embodiment of the invention. Other slot selections may be utilized depending on liftgate type, vehicle bed height, desired liftgate ground clearance, etc.

FIGS. 6-11 illustrate a process of mounting a liftgate in selected slots of mounting brackets attached under a vehicle bed, and adjusting the liftgate position, according to an embodiment of the invention. The process allows maintaining maximum ground clearance between the mounted liftgate and ground, while enabling horizontally sliding the liftgate in the slots for lining up the lift platform and the vehicle bed in horizontal and vertical directions.

Figure 6:
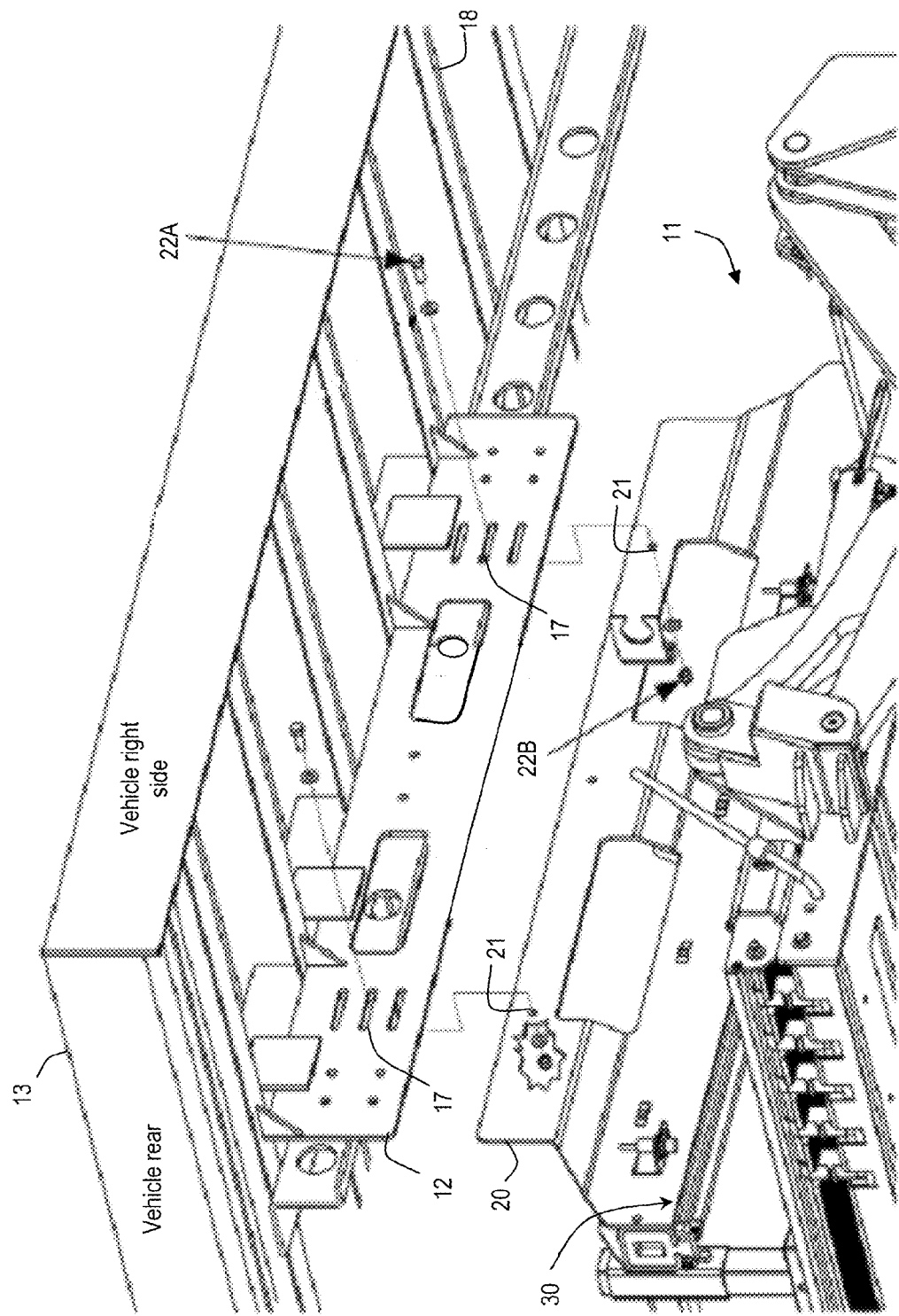
FIG. 6 shows a right side perspective view of the stowed liftgate being raised for mounting in middle slots on the mounting brackets under the vehicle bed, according to an embodiment of the invention.

Specifically, FIG. 6 shows a right side perspective view of the liftgate 11 wherein openings 21 of a right side slider 20 are to be engaged to middle mounting slots 17 on a right side mounting bracket 12 under the vehicle bed 13 via bolts 22. Though not shown in FIG. 6, similarly, the openings 21 of a left side slider 20 are to be engaged to middle mounting slots 17 on a left side mounting bracket 12 under the vehicle bed 13 via bolts 22. After mounting the liftgate 11 on the brackets 12, the liftgate position is adjusted as illustrated in FIGS. 7-11 and described below.

Figure 7:
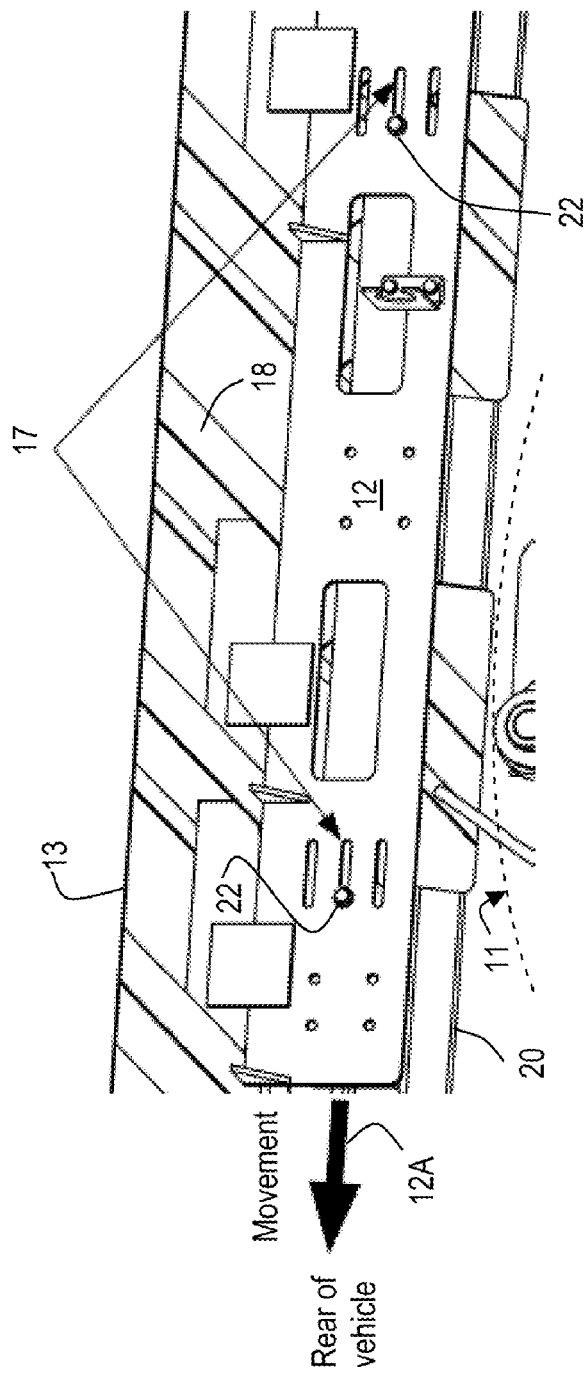
FIG. 7 shows a right side view of the liftgate slidably mounted via bolts in middle slots in the mounting brackets under the vehicle, allowing movement of the liftgate horizontally towards the rear of the vehicle while sliding in the mounting slots, for horizontal position adjustment, according to an embodiment of the invention.

Specifically, FIG. 7 shows a right side view of a slider 20 of the liftgate 11 slidably mounted via bolts 22 in middle mounting slots 17 in a bracket 12 under the vehicle bed 13 (without the bolts tightened). For adjustment, the liftgate 11 is moved (pulled) horizontally towards the rear of the vehicle (along arrow 12A) with the bolts 22 sliding in the mounting slots 17. This allows horizontal position adjustment for the liftgate 11 relative to the rear of the vehicle. While the liftgate slides in slots 17, the desired liftgate ground clearance h (FIG. 3B) is maintained. Preferably, a maximum liftgate ground clearance h is maintained given the bed height H.

Then, the liftgate is operated to lift the liftgate platform for adjustment relative to the vehicle bed 13. As noted, in this example the liftgate 11 is a stow away lift gate, and to unstow the liftgate 11 from the stowed position under the vehicle bed, actuators power roll out the liftgate "lifting mechanism" (including lifting linkage 160 and platform 23) from under the vehicle bed 13 on a pair of essentially horizontal rails 30 of the sliders 21 (arrow 31, FIGS. 3A, 12) towards the rear of the vehicle. Rolling out the liftgate mechanism from under the vehicle on the rails 30 is part of normal operation of the lift and is independent of sliding the entire liftgate 11 in the slots 17. In another example of liftgate type which the present invention is applicable to, such as the liftgate 11A in FIGS. 14B-D, for normal operation the liftgate 11A is stowed/unstowed without rolling in/out under the vehicle.

Figure 8:
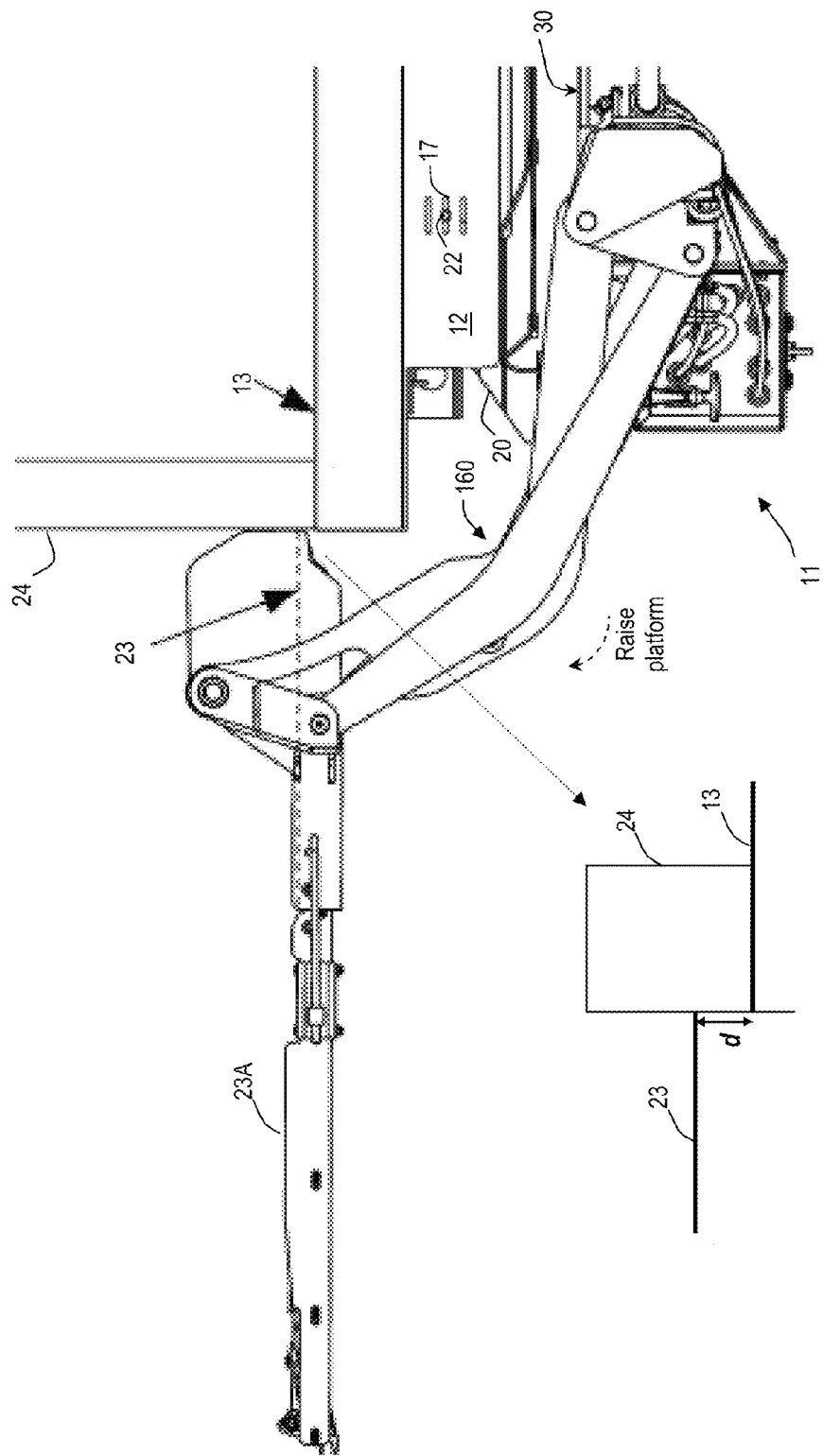
FIG. 8 shows the liftgate of FIG. 7 unstowed from under the vehicle bed and its platform unfolded and raised via the liftgate actuators until it stops against the vehicle body, wherein the platform is at a vertical position above the vehicle bed, according to an embodiment of the invention.

FIG. 8 shows the liftgate 11 of FIG. 7 rolled out on rails 30 from under the vehicle bed 13, and liftgate platform 23 (having at least one foldable section 23A) unfolded. The platform 23 is then raised by action of an actuator on pivoting linkage 160, until it stops (e.g., at the end of its vertical motion range) against the vehicle cargo area entrance frame 24 at the rear of the vehicle. In this case, the platform 23 is a vertical distance d above the vehicle bed 13.

For proper liftgate operation, certain criteria should be met. One criterion is that the platform 23 and the vehicle bed 13 should be at essentially the same level when the platform 23 is fully raised against the vehicle bed by the linkage mechanism 160. At the same time, another criterion is that there should be essentially no horizontal gap between the platform 23 and the vehicle bed 13 when the platform 23 is fully raised against the vehicle bed 13.

Figure 9:
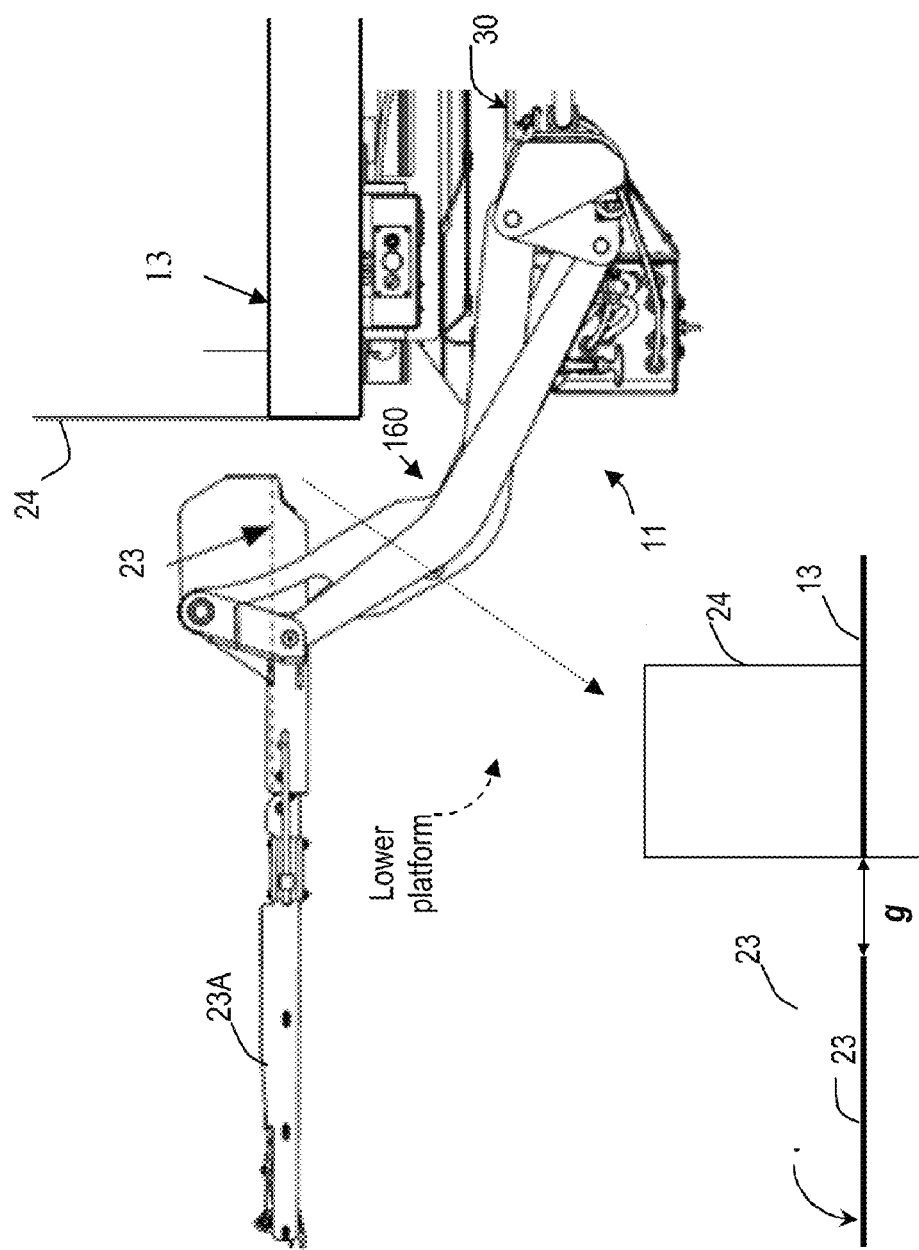
FIG. 9 shows the liftgate of FIG. 8 with its platform lowered via the liftgate actuators to a vertical position at the level of the vehicle bed, causing a horizontal gap between the platform and the vehicle bed, according to an embodiment of the invention.

To adjust position of the liftgate 11 such that the above criteria is met, FIG. 9 shows the liftgate 11 of FIG. 8, wherein an operator lowers the platform 23 by an increment via the liftgate linkage mechanism 160 (and actuator) to a vertical position at the level of the vehicle bed 13. However, this may cause a horizontal gap g between the platform 23 and the vehicle bed 13 due to the action of the linkage mechanism 160.

Figure 10:
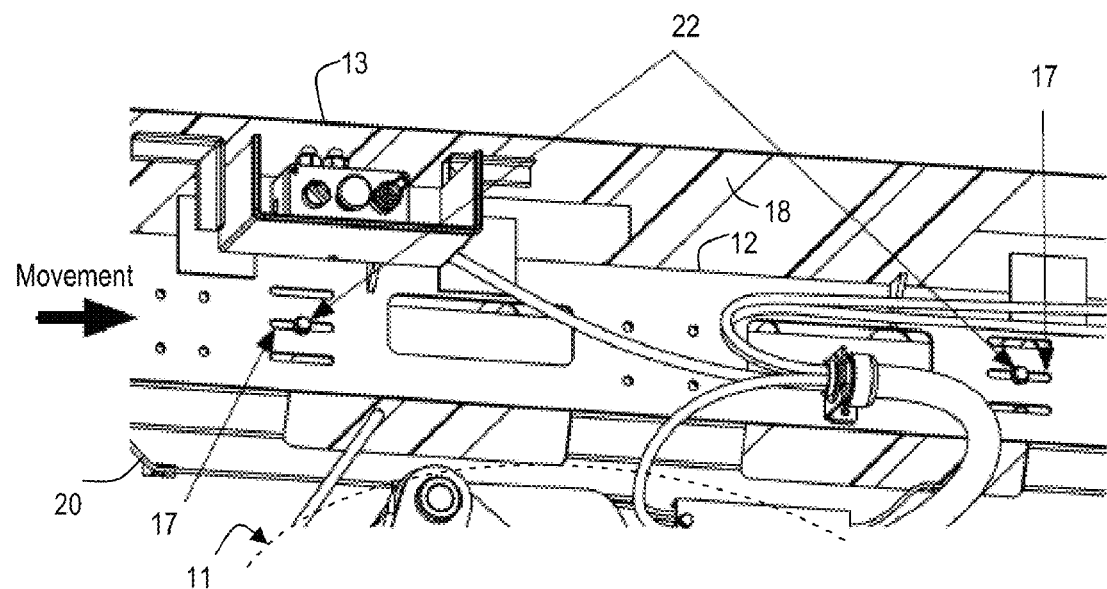
FIG. 10 shows the liftgate of FIG. 9 with its platform at a vertical position at the level of the vehicle bed, being moved towards the front of the vehicle (opposite direction of FIG. 7) while sliding in the mounting slots for horizontal position adjustment to eliminate the horizontal gap between the platform and the vehicle bed, according to an embodiment of the invention.

FIG. 10 shows the liftgate of FIG. 9 with its raised platform 23 at a vertical position at the level of the vehicle bed 13, wherein the liftgate 11 is moved (pushed) towards the front of the vehicle (opposite direction of FIG. 7) with the bolts 22 sliding in the mounting slots 17. This allows horizontal position adjustment of the liftgate 11 relative to the rear of the vehicle to eliminate the horizontal gap g between the platform 23 and the vehicle bed 13, while at the same time maintaining liftgate ground clearance h (FIG. 3B).

Figure 11:
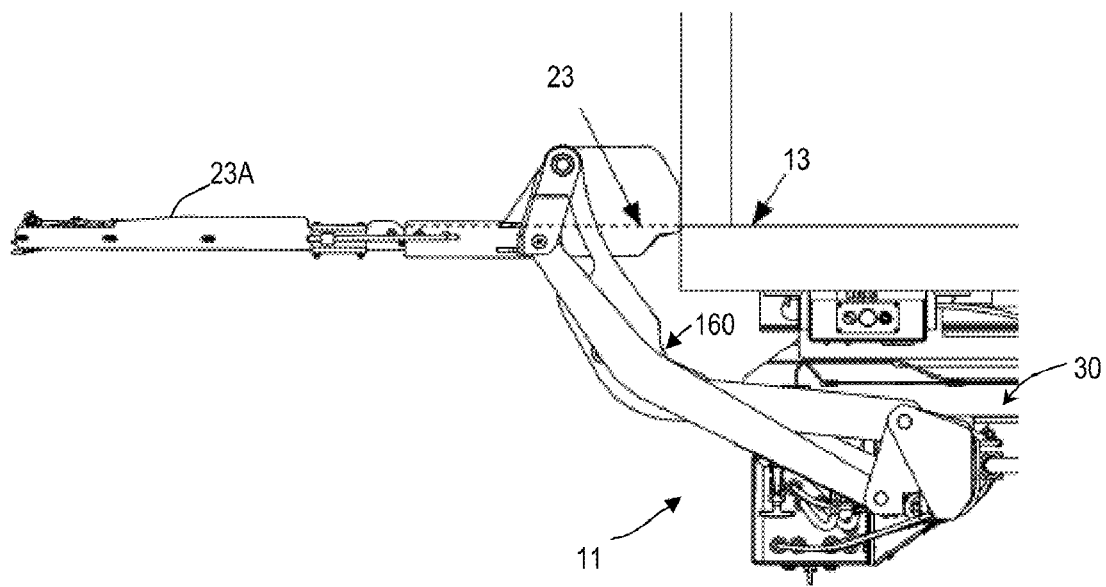
FIG. 11 shows the liftgate of FIG. 10 with the platform at a vertical position essentially at the level of the vehicle bed and essentially no horizontal gap with the vehicle bed, such that said bolts may be tightened to fixedly maintain the liftgate in the mounting slots, according to an embodiment of the invention.

FIG. 11 shows the liftgate 11 of FIG. 10 with its raised platform 23 at a vertical position essentially at the level of the vehicle bed 13 and essentially no horizontal gap with the vehicle bed 13. As the above criteria are not met, the bolts 22 may be tightened to fixedly maintain the liftgate in the mounting slots 17. This allows the liftgate 11 to work properly within its operations range. The lift platform 23 can reach the ground when lowered and also lines up with the vehicle bed 13 when raised, while maintaining desired ground clearance range between the liftgate 11 and ground when the liftgate position is adjusted (e.g., FIGS. 7-11), when the liftgate is stowed, when the liftgate is unstowed and when the liftgate is routinely operated.

Figure 12:
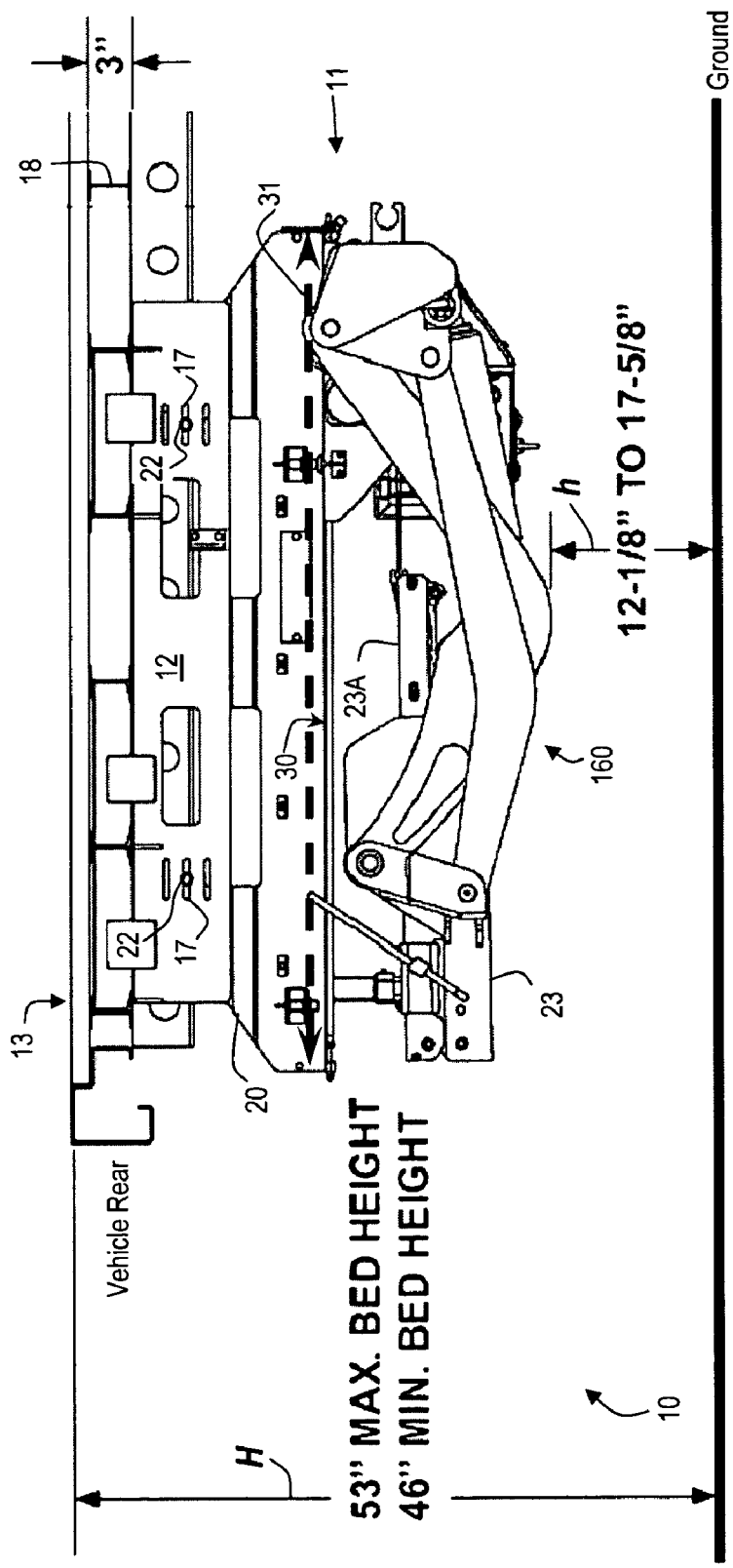
FIG. 12 shows a right side view of the liftgate system with the liftgate platform folded and liftgate stowed under a vehicle bed, wherein the vehicle has 3" crossmembers and the lowermost part of the stowed liftgate is at a desired ground clearance range relative to vehicle bed height, according to an embodiment of the invention.

FIG. 12 shows a right side view of an example liftgate system 10 according to the invention, where the stow away liftgate platform 23 is folded and the liftgate lifting mechanism stowed under the vehicle bed 13. In this example, the vehicle bed has 3" crossmembers, and the vehicle bed height H to ground ranges from about 46" to 53" such that corresponding liftgate ground clearance h from the lowest part of the liftgate 11 to ground ranges from about 12⅛" to 17⅝".

Figure 13:
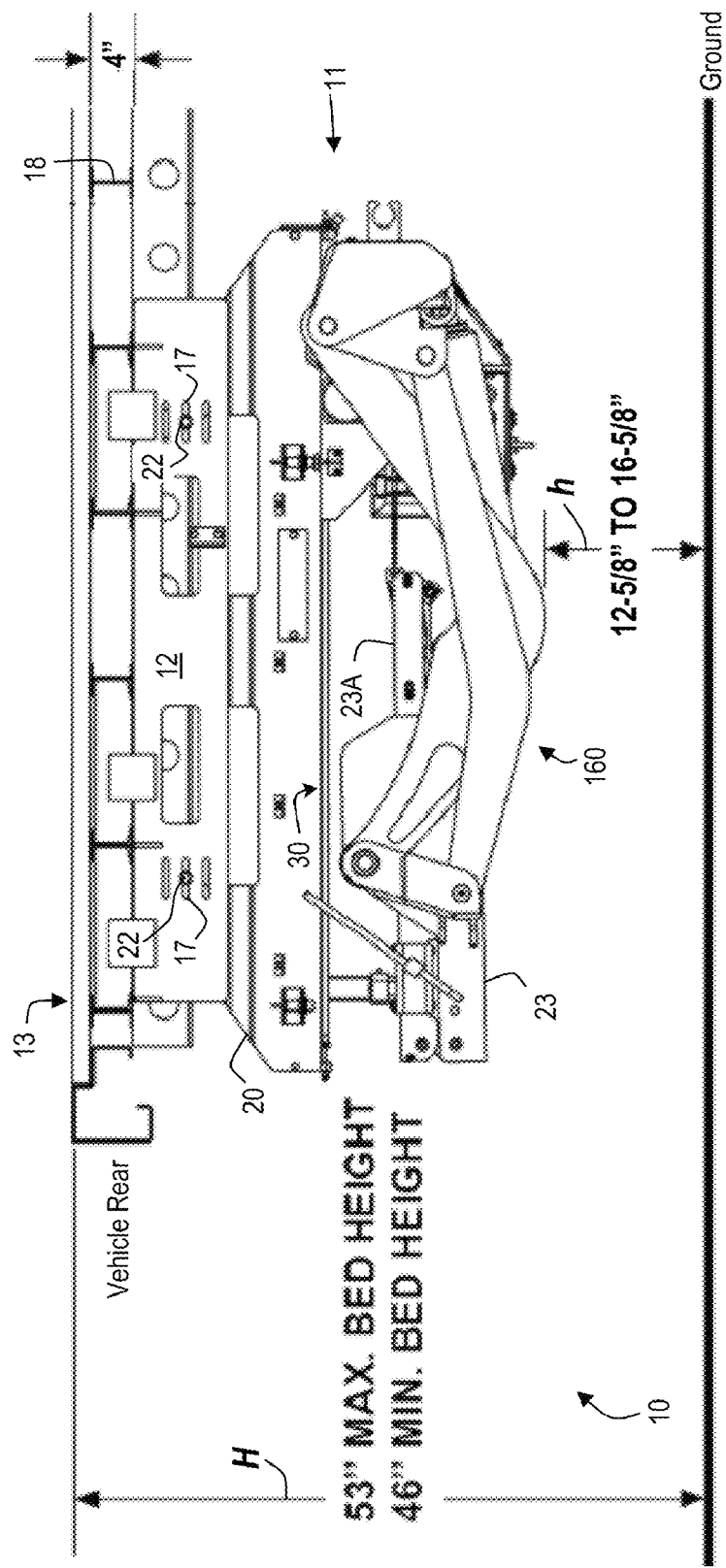
FIG. 13 shows a right side view of the liftgate system with the liftgate platform folded and liftgate stowed under a vehicle bed, wherein the vehicle has 4" crossmembers and the lowermost part of the stowed liftgate is at a desired ground clearance range relative to vehicle bed height, according to an embodiment of the invention.

FIG. 13 shows a right side view of an example liftgate system 10 according to the invention, with the stow away liftgate platform 23 folded and the liftgate lifting mechanism stowed under the vehicle bed 13. In this example, the vehicle bed has 4" crossmembers, and the vehicle bed height H to ground ranges from about 46" to 53" such that corresponding liftgate ground clearance h from the lowest part of the liftgate 11 to ground ranges from about 12⅝" to 16⅝".

FIG. 14A shows a rear left perspective view of a liftgate system 10 comprising a liftgate mounted on mounting brackets 12 (not shown) under the vehicle bed 13, with the lift platform 23 unfolded and lowered to the ground, according to an embodiment of the invention.

Figure 14B:
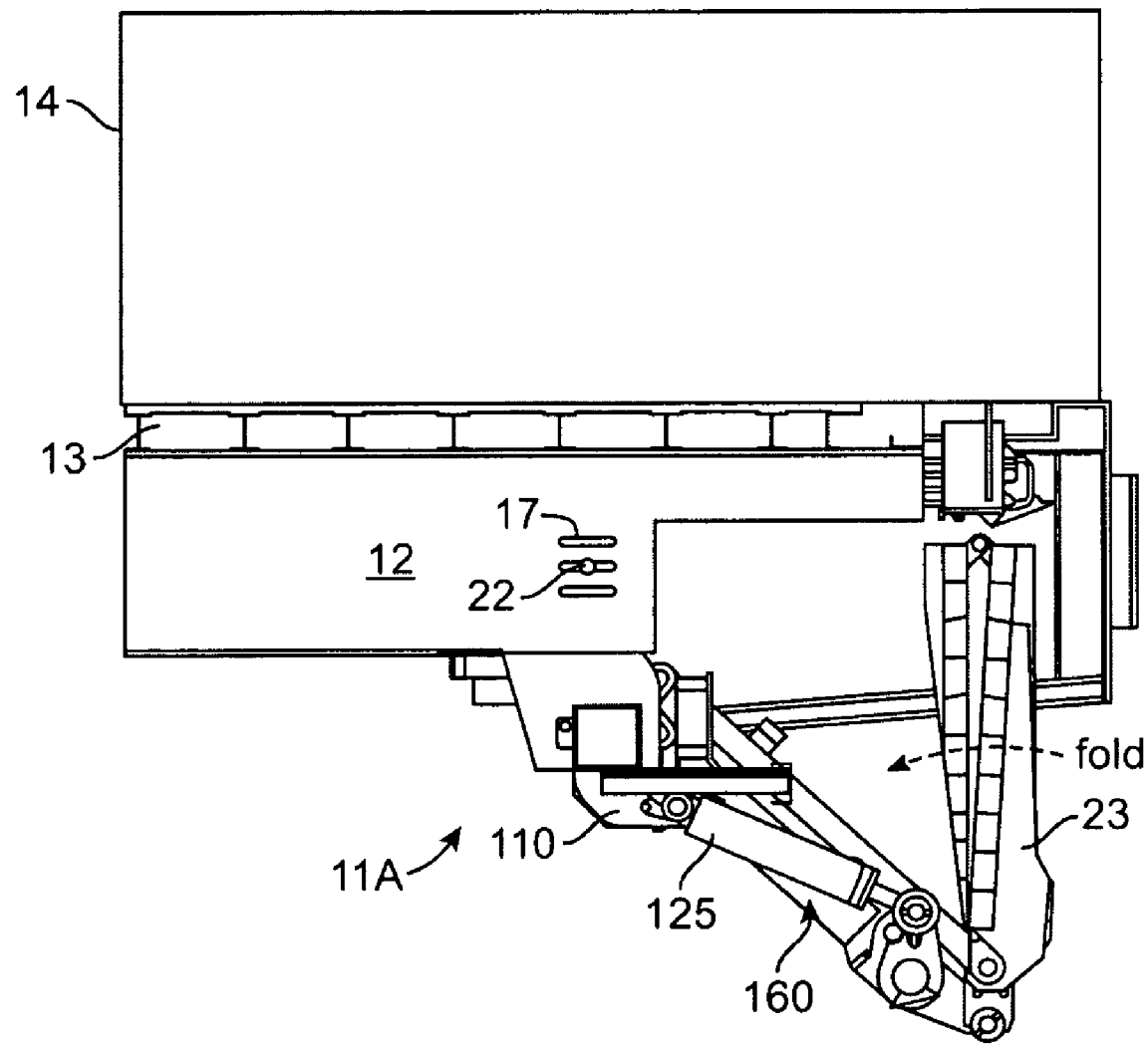
FIGS. 14B-D illustrate left side view of a folding and stowing sequence for the platform of a liftgate mounted on mounting brackets under a vehicle bed, according to an embodiment of the invention.
Figure 14C:
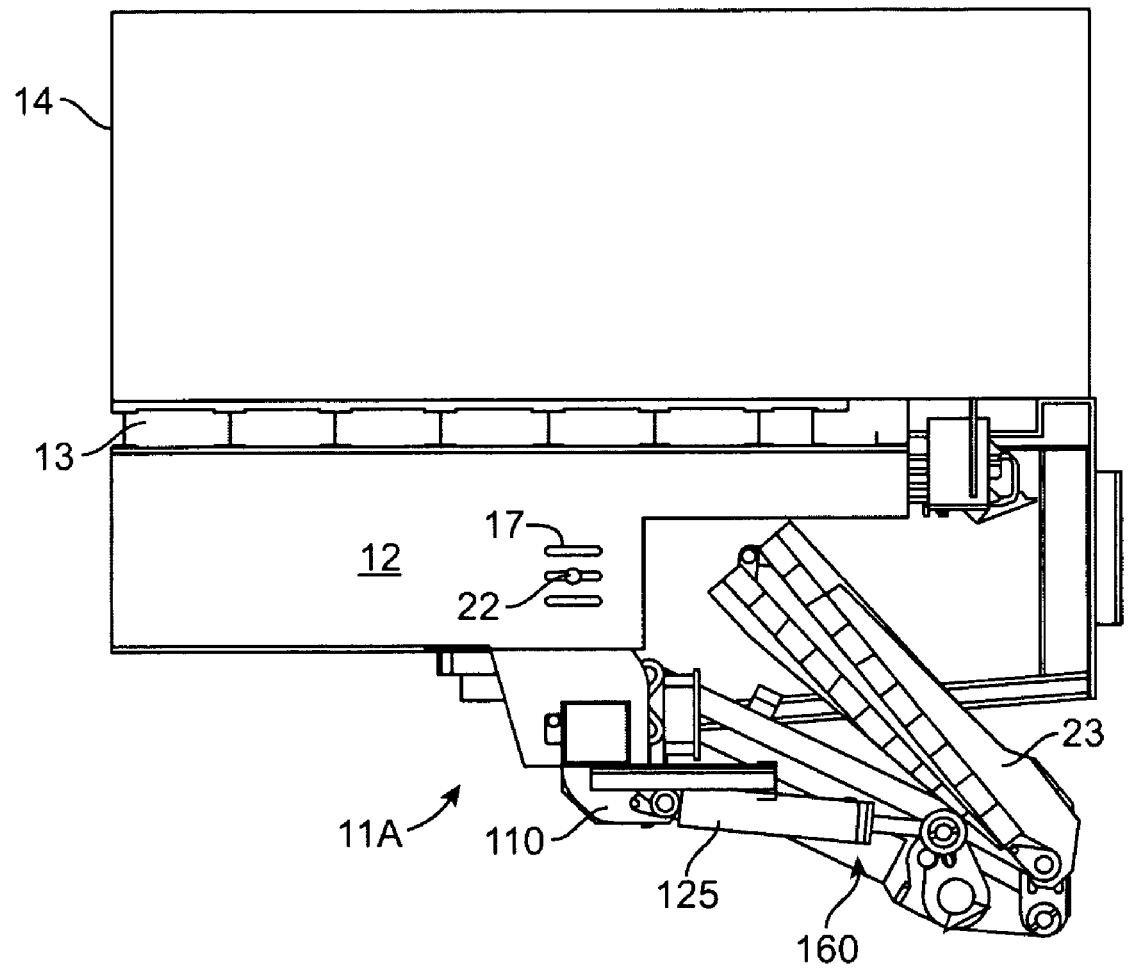
Figure 14D:
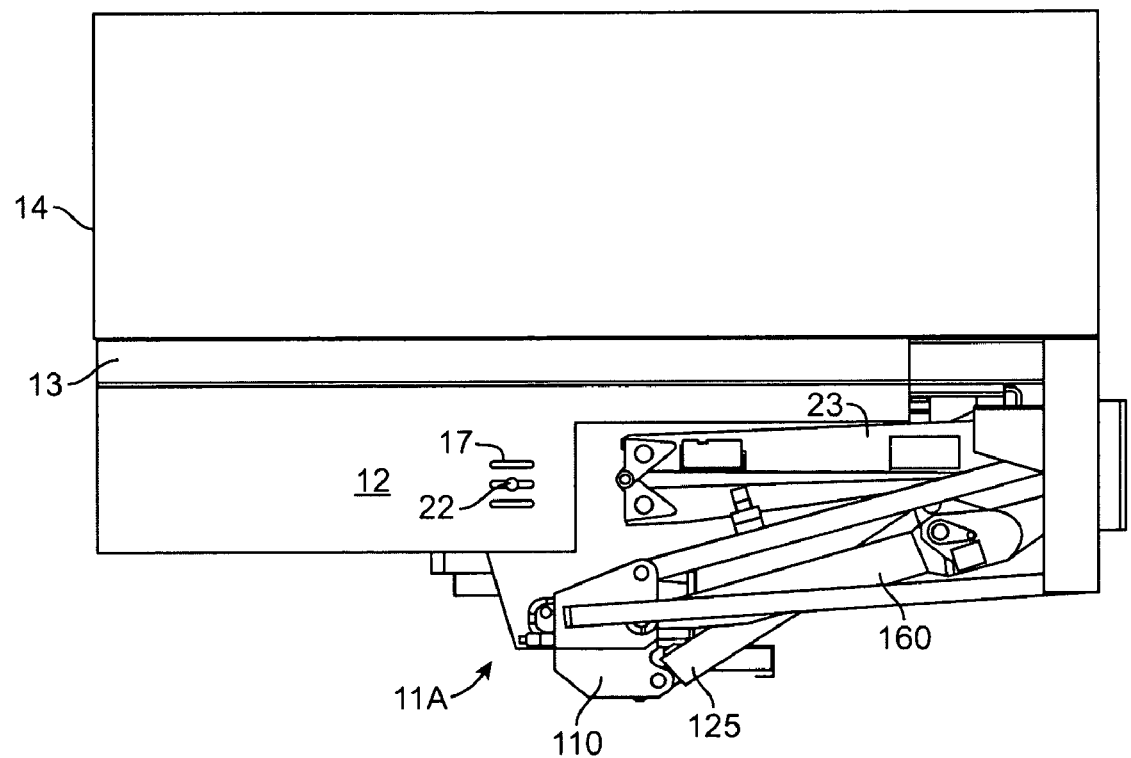

FIGS. 14B-D illustrate left side view of a stowing sequence for another liftgate 11A having a folding platform 23 mounted in slots 17 of mounting brackets 12 under a vehicle bed 13, according to an embodiment of the invention. The platform 23 is folded under the vehicle bed 13 by action of actuator 125 between linkage 160 and frame 110. The position of the liftgate 11A has been adjusted for proper operation according to a similar process as described above in relation to FIGS. 7-11.

Figure 15:
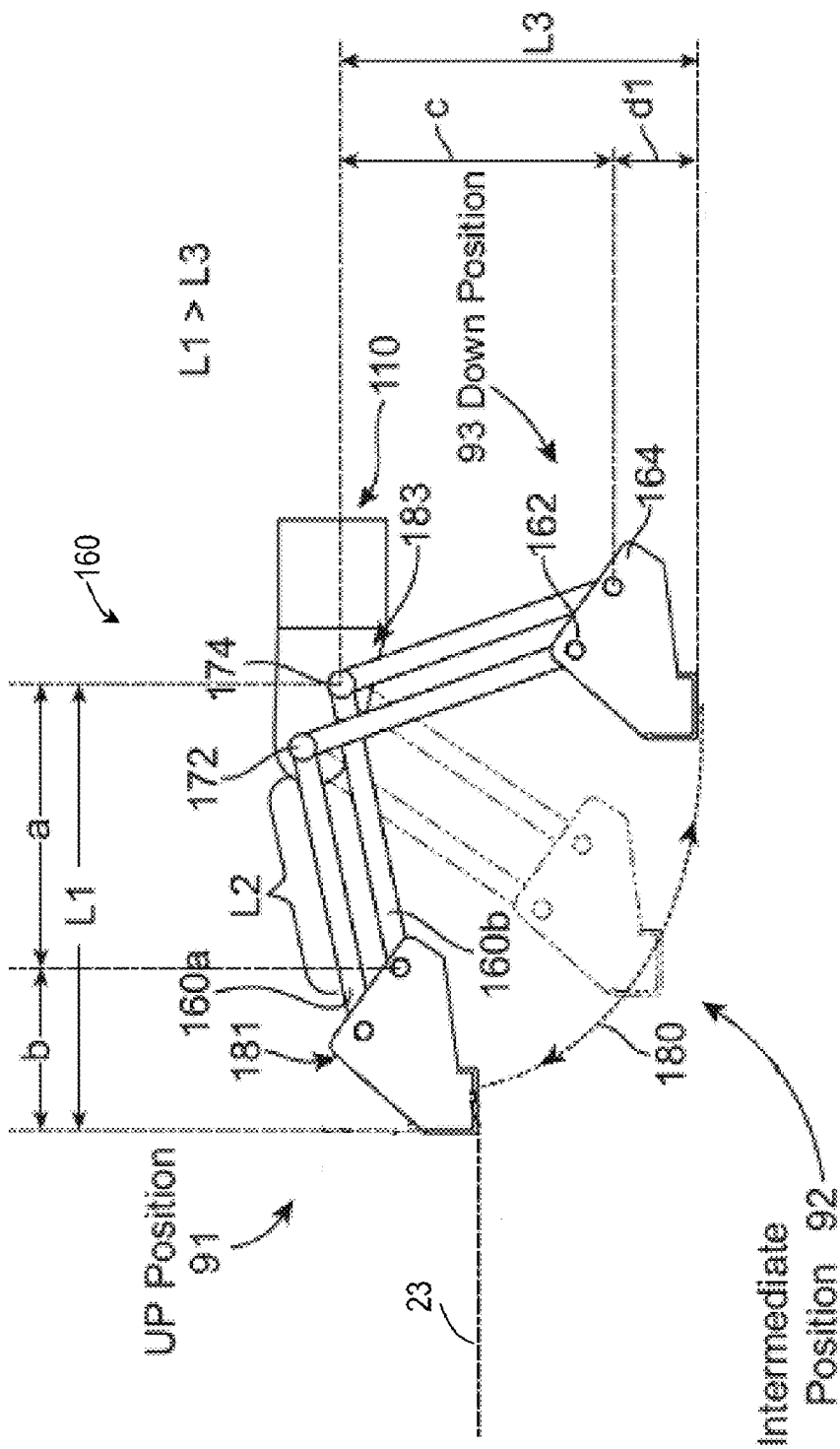
FIG. 15 shows action of an example parallelogram liftgate linkage, according to an embodiment of the invention.

FIG. 15 shows a side view of a parallelogram liftgate linkage 160 moving from an Up (raised, or extended) position 91 to an Intermediate position 92 and then to a Down (lowered or retracted) position 93. The linkage mechanism 160 has two linkage arms 160a and 160b, which are coupled to the platform 23 at a first set of pivot points 162, 164 on a first parallelogram coupler 181, and are coupled to a frame 110 at a second set of pivot points 172, 174 on a second parallelogram coupler 183. As a result of using the parallelogram linkage mechanism 160, the platform 23 maintains the same angle (e.g., substantially parallel) relative to the ground level as the platform 23 is raised/lowered. As a result of using the second set of pivot points 172, 174, and the first set of pivot points 162, 164, the platform 23 moves around both first and second sets of pivot points, such that the resulting rotation trajectory 180 around the axis of the frame 110 is non-circular (said axis is perpendicular to the plane of the drawing page). The trajectory 180 of the platform 23, as seen from the Up position 91, to the Intermediate position 92, and Down position 93, flattens (reaches a minimum plateau) closer to the ground.

The present invention has been described in considerable detail with reference to certain preferred versions thereof; however, other versions are possible. Therefore, the spirit and scope of the appended claims should not be limited to the description of the preferred versions contained herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of installing a liftgate under a vehicle bed, the liftgate comprising a platform coupled to a support frame via a lift linkage, the platform capable of being moved by an actuator via the lift linkage between a raised position and a lowered position, the method comprising:

attaching a liftgate mounting device under the vehicle bed, wherein the liftgate mounting device comprises an elongate bracket having a group of elongate slots spaced relative to one another along a width of the bracket so as to be at different distances to the vehicle bed when the bracket is lengthwise installed under the vehicle bed, such that the slots are vertically stacked on the bracket relative to one another essentially parallel to the vehicle bed when the bracket is installed under the vehicle bed to accommodate different vehicle bed heights so as to maintain the liftgate within a desired vertical ground clearance when mounted on a slot on said bracket under the vehicle bed;

selecting a slot from said group of elongate slots based on the vehicle bed height from ground and desired liftgate ground clearance range; and slidably mounting the liftgate on the selected slot under the vehicle bed.

2. The method of claim 1 further comprising:

sliding the liftgate in the slot towards the rear of the vehicle bed;

fully raising said platform until it abuts against the vehicle body;

if the fully raised platform is vertically at a level above the vehicle bed, then lowering the platform to be level with the vehicle bed.

3. The method of claim 2 further comprising:

if there is a horizontal gap between the leveled platform and the vehicle bed, then sliding the liftgate in the slot towards the vehicle bed to close the gap; and fixing the liftgate in relation to the slot to prevent further slidable movement of the liftgate in the slot.

4. The method of claim 3 wherein the bracket allows the liftgate to be slidably mounted on a selected slot of the mounting bracket under a vehicle bed, and maintaining the liftgate within a desired vertical ground clearance range.

5. The method of claim 4 wherein a slot is selected from said group of elongate slots based on vehicle bed height to ground to maintain the liftgate within a desired vertical ground clearance when mounted on the bracket and the liftgate is horizontally slid in the slot for position adjustment relative to the vehicle bed.

6. The method of claim 5 wherein:

the liftgate mounting device comprises a pair of elongate brackets, each bracket including two spaced groups of elongate slots along a length of said bracket;

the two groups of elongate slots on each bracket are at the same level along a width of said bracket; and each group of elongate slots on a bracket comprises multiple elongate slots vertically stacked on the bracket relative to one another, wherein each slot is elongated along the length of the bracket, and wherein said group of elongate slots are substantially horizontal relative to one another and the vehicle bed when the bracket is installed under the vehicle bed essentially parallel to ground.

7. The method of claim 6 wherein:

the slots in each group of elongate slots on a bracket are vertically spaced on the bracket relative to one another to accommodate different vehicle bed heights so as to maintain the liftgate within a desired vertical ground clearance when mounted in a slot on said bracket under a vehicle bed; and each bracket allows the liftgate to be slidably mounted in a selected slot in each group of elongate slots on the bracket, and maintains the liftgate within a desired vertical ground clearance range.

8. The method of claim 7 wherein each bracket is substantially rectangular in shape and the two groups of elongate slots are spaced along the length of the bracket, and each slot has a length along the length of the bracket.

9. The method of claim 8 wherein:
the liftgate includes a pair of spaced parallel sliders corresponding to the brackets, for slidably disposing the liftgate in selected bracket slots when the brackets are attached under the vehicle bed, with essentially the same spacing and orientation as the sliders;
all the selected slots in said groups of elongate slots on the brackets are at the same vertical distance to ground.

10. The method of claim 1, wherein:
selecting a slot comprises vertically adjusting a position of the liftgate relative to the vehicle bed and/or ground; and
slidably mounting the liftgate on the selected slot comprises horizontally adjusting a position of the liftgate relative to a rear of the vehicle bed.

11. The method of claim 1, wherein the vehicle bed height comprises a vertical distance between the vehicle bed and ground.

12. The method of claim 1, wherein:
said group of elongate slots comprises multiple substantially horizontal slots in parallel along a length of the bracket, wherein the slots are vertically spaced along the width of the bracket.

13. A liftgate system for mounting under a vehicle bed, comprising:
a liftgate comprising a platform coupled to a support frame via a lift linkage, the platform capable of being moved by an actuator via the lift linkage between a raised position and a lowered position; and
a liftgate mounting device comprising an elongate bracket having a group of elongate slots spaced relative to one another along a width of the bracket so as to be at different distances to the vehicle bed when the bracket is lengthwise installed under the vehicle bed, such that
the slots are vertically stacked on the bracket relative to one another essentially parallel to the vehicle bed when the bracket is installed under the vehicle bed to accommodate different vehicle bed heights so as to maintain the liftgate within a desired vertical ground clearance when the liftgate is slidably mounted horizontally under the vehicle bed via said support frame mounted on a slot selected from said group of elongate slots on the bracket based on the vehicle bed height from ground and the desired liftgate ground clearance range.

14. The system of claim 13 wherein the bracket allows the liftgate to be slidably mounted horizontally on a selected slot of the mounting bracket under a vehicle bed, and maintaining the liftgate within a desired vertical ground clearance range.

15. The system of claim 14 wherein a slot is selected from said group of elongate slots based on vehicle bed height to ground to maintain the liftgate within a desired vertical ground clearance when mounted on the bracket and the liftgate is horizontally slid in the slot for position adjustment relative to the vehicle bed.

16. The system of claim 15 wherein:
the liftgate mounting device comprises a pair of elongate brackets, each bracket including two spaced groups of elongate slots along a length of said bracket;
the two groups of elongate slots on each bracket are at the same level along a width of said bracket; and
each group of elongate slots on a bracket comprises multiple elongate slots vertically stacked on the bracket relative to one another, wherein each slot is elongated along the length of the bracket, and wherein said group of elongate slots are substantially horizontal relative to one another and the vehicle bed when the bracket is installed under the vehicle bed essentially parallel to ground.

17. The system of claim 16 wherein:
the slots in each group of elongate slots on a bracket are vertically spaced on the bracket relative to one another to accommodate different vehicle bed heights so as to maintain the liftgate within a desired vertical ground clearance when mounted in a slot on said bracket under a vehicle bed; and
each bracket allows the liftgate to be slidably mounted in a selected slot in each group of elongate slots on the bracket, and maintains the liftgate within a desired vertical ground clearance range.

18. The system of claim 17 wherein each bracket is substantially rectangular in shape and the two groups of elongate slots are spaced along the length of the bracket, and each slot has a length along the length of the bracket.

19. The system of claim 18 wherein:
the liftgate includes a pair of spaced parallel sliders corresponding to the brackets, for slidably disposing the liftgate in selected bracket slots when the brackets are attached under the vehicle bed, with essentially the same spacing and orientation as the sliders; and
all the selected slots in said groups of elongate slots on the brackets are at the same vertical distance to ground.

20. The system of claim 13, wherein:
said group of elongate slots comprises multiple substantially horizontal slots in parallel along a length of the bracket, wherein the slots are vertically spaced along the width of the bracket.

21. A liftgate mounting device for mounting a liftgate under a vehicle bed, the liftgate comprising a platform coupled to a support frame via a lift linkage, the platform capable of being moved by an actuator via the lift linkage between a raised position and a lowered position, the mounting device comprising:
an elongate bracket having a group of elongate slots spaced relative to one another along a width of the bracket so as to be at different distances to the vehicle bed when the bracket is lengthwise installed under the vehicle bed, such that
the slots are vertically stacked on the bracket relative to one another essentially parallel to the vehicle bed when the bracket is installed under the vehicle bed to accommodate different vehicle bed heights so as to maintain the liftgate within a desired vertical ground clearance when the liftgate is slidably mounted horizontally under the vehicle bed via said support frame mounted on a slot selected from said group of elongate slots on the bracket based on the vehicle bed height from ground and the desired liftgate ground clearance range.

22. The mounting device of claim 21 wherein the bracket allows the liftgate to be slidably mounted horizontally on a selected slot of the mounting bracket under a vehicle bed, and maintaining the liftgate within a desired vertical ground clearance range.

23. The mounting device of claim 22 wherein a slot is selected from said group of elongate slots based on vehicle bed height to ground to maintain the liftgate within a desired vertical ground clearance when mounted on the bracket and the liftgate is horizontally slid in the slot for position adjustment relative to the vehicle bed.

24. The mounting device of claim 23 further comprising:

a pair of elongate brackets, each bracket including two spaced groups of elongate slots along a length of said bracket;

the two groups of elongate slots on each bracket are at the same level along a width of said bracket; and each group of elongate slots on a bracket comprises multiple elongate slots vertically stacked on the bracket relative to one another, wherein each slot is elongated along the length of the bracket, and wherein said group of elongate slots are substantially horizontal relative to one another and the vehicle bed when the bracket is installed under the vehicle bed essentially parallel to ground.

25. The mounting device of claim 24 wherein:

the slots in each group of elongate slots on a bracket are vertically spaced on the bracket relative to one another to accommodate different vehicle bed heights so as to maintain the liftgate within a desired vertical ground clearance when mounted in a slot on said bracket under a vehicle bed; and each bracket allows the liftgate to be slidably mounted in a selected slot in each group of elongate slots on the bracket, and maintains the liftgate within a desired vertical ground clearance range.

26. The mounting device of claim 25 wherein each bracket is substantially rectangular in shape and the two groups of elongate slots are spaced along the length of the bracket, and each slot has a length along the length of the bracket.

27. The mounting device of claim 26 wherein:

the liftgate includes a pair of spaced parallel sliders corresponding to the brackets, for slidably disposing the liftgate in selected bracket slots when the brackets are attached under the vehicle bed, with essentially the same spacing and orientation as the sliders;

all the selected slots in said groups of elongate slots on the brackets are at the same vertical distance to ground.

28. The mounting device of claim 21, wherein:

said group of elongate slots comprises multiple substantially horizontal slots in parallel along a length of the bracket, wherein the slots are vertically spaced along the width of the bracket.

* * * * *